(12) United States Patent
Zhu et al.

(10) Patent No.: US 11,408,496 B2
(45) Date of Patent: Aug. 9, 2022

(54) GEAR-HYDRAULIC-METAL BELT INTEGRATED MULTI-MODE HYDRO-MECHANICAL HYBRID TRANSMISSION DEVICE

(71) Applicant: Jiangsu University, Jiangsu (CN)

(72) Inventors: Zhen Zhu, Jiangsu (CN); Yingfeng Cai, Jiangsu (CN); Long Chen, Jiangsu (CN); Xiang Tian, Jiangsu (CN); Changgao Xia, Jiangsu (CN); Falin Zeng, Jiangsu (CN); Chaochun Yuan, Jiangsu (CN); Jiajia Wang, Jiangsu (CN); Xiaodong Sun, Jiangsu (CN); Dehua Shi, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 15/734,998

(22) PCT Filed: Feb. 10, 2020

(86) PCT No.: PCT/CN2020/074581
§ 371 (c)(1),
(2) Date: Dec. 4, 2020

(87) PCT Pub. No.: WO2021/147124
PCT Pub. Date: Jul. 29, 2021

(65) Prior Publication Data
US 2021/0372512 A1 Dec. 2, 2021

(30) Foreign Application Priority Data
Jan. 20, 2020 (CN) .......................... 202010066884.6

(51) Int. Cl.
*F16H 47/04* (2006.01)
(52) U.S. Cl.
CPC .................................. *F16H 47/04* (2013.01)

(58) Field of Classification Search
CPC ....................................................... F16H 47/04
See application file for complete search history.

(56) References Cited

U.S. PATENT DOCUMENTS 3,988,949 A * 11/1976 Weseloh ................... F16H 3/72
475/80
5,364,316 A * 11/1994 Brambilla ........... F16H 37/0846
475/211

(Continued)

FOREIGN PATENT DOCUMENTS

| CN | 101158392 | 4/2008 |
| CN | 102537269 | 7/2012 |

(Continued)

OTHER PUBLICATIONS

"International Search Report (Form PCT/ISA/210) of PCT/CN2020/074581," dated Oct. 27, 2020, pp. 1-5.

*Primary Examiner* — Erin D Bishop
(74) *Attorney, Agent, or Firm* — JCIP Global Inc.

(57) ABSTRACT

A gear-hydraulic-metal belt integrated multi-mode hydro-mechanical hybrid transmission device includes an input assembly, an output assembly, a metal belt transmission mechanism, a planetary gear assembly, a hydraulic transmission mechanism, a clutch assembly and a brake assembly. The input assembly is connected to the metal belt transmission mechanism, the planetary gear assembly and the hydraulic transmission mechanism. The metal belt transmission mechanism and the hydraulic transmission mechanism are connected to the planetary gear assembly. The planetary gear assembly is connected to the output assembly. The clutch assembly connects the input assembly to the metal belt transmission mechanism and the planetary gear assembly, and connects each of the metal belt transmission mechanism and the hydraulic transmission mechanism to the planetary gear assembly. The clutch assembly and the brake (Continued)

assembly provide a continuous transmission ratio between the input assembly and the output assembly.

6 Claims, 10 Drawing Sheets

(56) References Cited

U.S. PATENT DOCUMENTS

| | | | |
|---|---|---|---|
| 6,413,189 B1 * | 7/2002 | Spiess | B60W 30/18045 |
| | | | 477/110 |
| 7,121,970 B2 * | 10/2006 | Funato | F16H 47/04 |
| | | | 475/78 |

FOREIGN PATENT DOCUMENTS

| | | |
|---|---|---|
| CN | 107869563 | 4/2018 |
| CN | 109723789 | 5/2019 |
| CN | 109751381 | 5/2019 |
| RU | 2233760 | 8/2004 |

* cited by examiner

GEAR-HYDRAULIC-METAL BELT INTEGRATED MULTI-MODE HYDRO-MECHANICAL HYBRID TRANSMISSION DEVICE

CROSS-REFERENCE TO RELATED APPLICATION

This application is a 371 of international application of PCT application serial no. PCT/CN2020/074581, filed on Feb. 10, 2020, which claims the priority benefit of China application no. 202010066884.6, filed on Jan. 20, 2020. The entirety of each of the above mentioned patent applications is hereby incorporated by reference herein and made a part of this specification.

BACKGROUND

Technical Field

The present invention relates to the field of variable-speed transmission devices, and in particular, to a gear-hydraulic-metal belt integrated multi-mode hydro-mechanical hybrid transmission device.

Description of Related Art

Variable-speed transmission devices perform stepped speed variation and stepless speed variation according to different transmission modes and perform single-flow transmission and hybrid transmission according to different transmission paths. Generally, gear transmission belongs to stepped speed variation, while metal belt transmission and hydraulic transmission belong to stepless speed variation, and the above three transmission modes belong to single-flow transmission. Gear transmission causes power interruption, but has high transmission efficiency; hydraulic transmission can provide high torque without power interruption, but has low efficiency; and metal belt transmission has high transmission efficiency, but has a limited transmission ratio range. Hybrid transmission eliminates the defects of single-flow transmission while carries forward its advantages, and thus has good application prospects. Hydraulic-gear hybrid transmission integrating hydraulic transmission and gear transmission and hydraulic-metal belt hybrid transmission integrating hydraulic transmission and metal belt transmission achieve high-efficiency stepless speed variation within respective set ranges, while gear-metal belt hybrid transmission integrating gear transmission and metal belt transmission achieves large-range and high-precision regulation within a unified range.

The prior art only involves the designs of single-flow transmission and hybrid transmission, or the designs of hydro-mechanical hybrid transmission devices integrating two types of single-flow transmission with one type of hybrid transmission, and fails to fully satisfy design requirements for transmission devices with multiple modes, especially multiple hybrid modes, in multiple working conditions.

SUMMARY

To eliminate the defects in the prior art, the present invention provides a gear-hydraulic-metal belt integrated multi-mode hydro-mechanical hybrid transmission device, which implements switching between multiple modes including hydraulic transmission, gear transmission, metal belt transmission, gear-metal belt hybrid transmission, hydraulic-gear hybrid transmission, and hydraulic-metal belt hybrid transmission through engagement/disengagement of a clutch assembly and a brake assembly.

The present invention achieves the above objective through the following technical solution.

A gear-hydraulic-metal belt integrated multi-mode hydro-mechanical hybrid transmission device includes an input assembly, an output assembly, a metal belt transmission mechanism, a planetary gear assembly, a hydraulic transmission mechanism, a clutch assembly, and a brake assembly. The input assembly is connected to the metal belt transmission mechanism, the planetary gear assembly, and the hydraulic transmission mechanism. The metal belt transmission mechanism and the hydraulic transmission mechanism are each connected to the planetary gear assembly. The planetary gear assembly is connected to the output assembly; the clutch assembly connects the input assembly to the metal belt transmission mechanism and the planetary gear assembly, and connects each of the metal belt transmission mechanism and the hydraulic transmission mechanism to the planetary gear assembly.

Further, the planetary gear assembly includes a front planetary gear mechanism and a rear planetary gear mechanism, a ring gear of the front planetary gear mechanism is connected to an output end of the input assembly. A sun gear of the front planetary gear mechanism is connected to a ring gear of the rear planetary gear mechanism, and a planet carrier of the rear planetary gear mechanism is connected to the output assembly. The ring gear of the rear planetary gear mechanism is connected to an output end of the metal belt transmission mechanism.

Further, the clutch assembly includes a first clutch and a fifth clutch. The first clutch is configured for selectively connecting an output end of the hydraulic transmission mechanism to a sun gear of the rear planetary gear mechanism to achieve synchronous rotation. The fifth clutch is configured for selectively connecting the ring gear of the rear planetary gear mechanism to the sun gear of the front planetary gear mechanism to achieve synchronous rotation. The brake assembly is configured for selectively connecting the ring gear of the rear planetary gear mechanism to a fixed member. The hydraulic transmission is provided between the input assembly and the output assembly by adjusting a displacement ratio of a hydraulic transmission system and controlling engagement of the first clutch, the fifth clutch, and the brake assembly.

Further, the clutch assembly further includes a fourth clutch, the fourth clutch is configured for selectively connecting a planet carrier of the front planetary gear mechanism to the planet carrier of the rear planetary gear mechanism to achieve synchronous rotation. The gear transmission is provided between the input assembly and the output assembly by controlling engagement of the fourth clutch, the fifth clutch, and the brake assembly.

Further, the clutch assembly includes a second clutch and a third clutch. The second clutch is configured for selectively connecting an input end of the metal belt transmission mechanism to the ring gear of the front planetary gear mechanism to achieve synchronous rotation. The third clutch is configured for selectively connecting the output end of the metal belt transmission mechanism to the sun gear of the rear planetary gear mechanism to achieve synchronous rotation. The metal belt transmission is provided between the input assembly and the output assembly by adjusting the transmission ratio of the metal belt transmission mechanism and controlling engagement of the second clutch and the third clutch.

Further, hydraulic-gear hybrid transmission is provided between the input assembly and the output assembly by adjusting the displacement ratio of the hydraulic transmission system and controlling engagement of the first clutch, the fourth clutch, and the fifth clutch.

Gear-metal belt hybrid transmission is provided between the input assembly and the output assembly by adjusting the transmission ratio of the metal belt transmission mechanism and controlling engagement of the second clutch and the fourth clutch.

Hydraulic-metal belt hybrid transmission is provided between the input assembly and the output assembly by adjusting the displacement ratio of the hydraulic transmission system, adjusting the transmission ratio of the metal belt transmission mechanism, and controlling engagement of the first clutch, the second clutch, and the fifth clutch.

Further, stepless speed regulation through switching among the transmission modes "hydraulic transmission-→gear transmission hydraulic→gear hybrid transmission" is provided by adjusting the displacement ratio of the hydraulic transmission mechanism and selectively controlling engagement of the clutch assembly and the brake assembly.

Further, stepless speed regulation through switching among the transmission modes "gear transmission→metal belt transmission gear→metal belt hybrid transmission" is provided by adjusting the transmission ratio of the metal belt transmission mechanism and selectively controlling engagement of the clutch assembly and the brake assembly.

Further, stepless speed regulation through switching among the transmission modes "hydraulic transmission-→metal belt transmission→hydraulic-metal belt hybrid transmission" is provided by adjusting the displacement ratio of the hydraulic transmission mechanism, adjusting the transmission ratio of the metal belt transmission mechanism, and selectively controlling engagement of the clutch assembly and the brake assembly.

The present invention has the following beneficial effects.

The gear-hydraulic-metal belt integrated multi-mode hydro-mechanical hybrid transmission device of the present invention implements switching between multiple modes including hydraulic transmission, gear transmission, metal belt transmission, gear-metal belt hybrid transmission, hydraulic-gear hybrid transmission, and hydraulic-metal belt hybrid transmission through engagement/disengagement of the clutch assembly and the brake assembly, so that the multi-mode hydro-mechanical hybrid transmission device meets the requirements of multiple working conditions and achieves the goal of energy management. The requirements of high-efficiency stepless speed variation in working conditions are satisfied by mode switching between hydraulic transmission, gear transmission, and hydraulic-gear hybrid transmission. The requirements of large-range and high-precision non-linear stepless speed regulation are satisfied by mode switching between gear transmission, metal belt transmission, and gear-metal belt hybrid transmission. The requirements of high-efficiency stepless speed regulation with multiple choices in a region are satisfied by mode switching between hydraulic transmission, metal belt transmission, and hydraulic-metal belt hybrid transmission.

DESCRIPTION OF THE EMBODIMENTS

The present invention is further described below with reference to the accompanying drawings and specific embodiments, but the protection scope of the present invention is not limited thereto.

Figure 1:
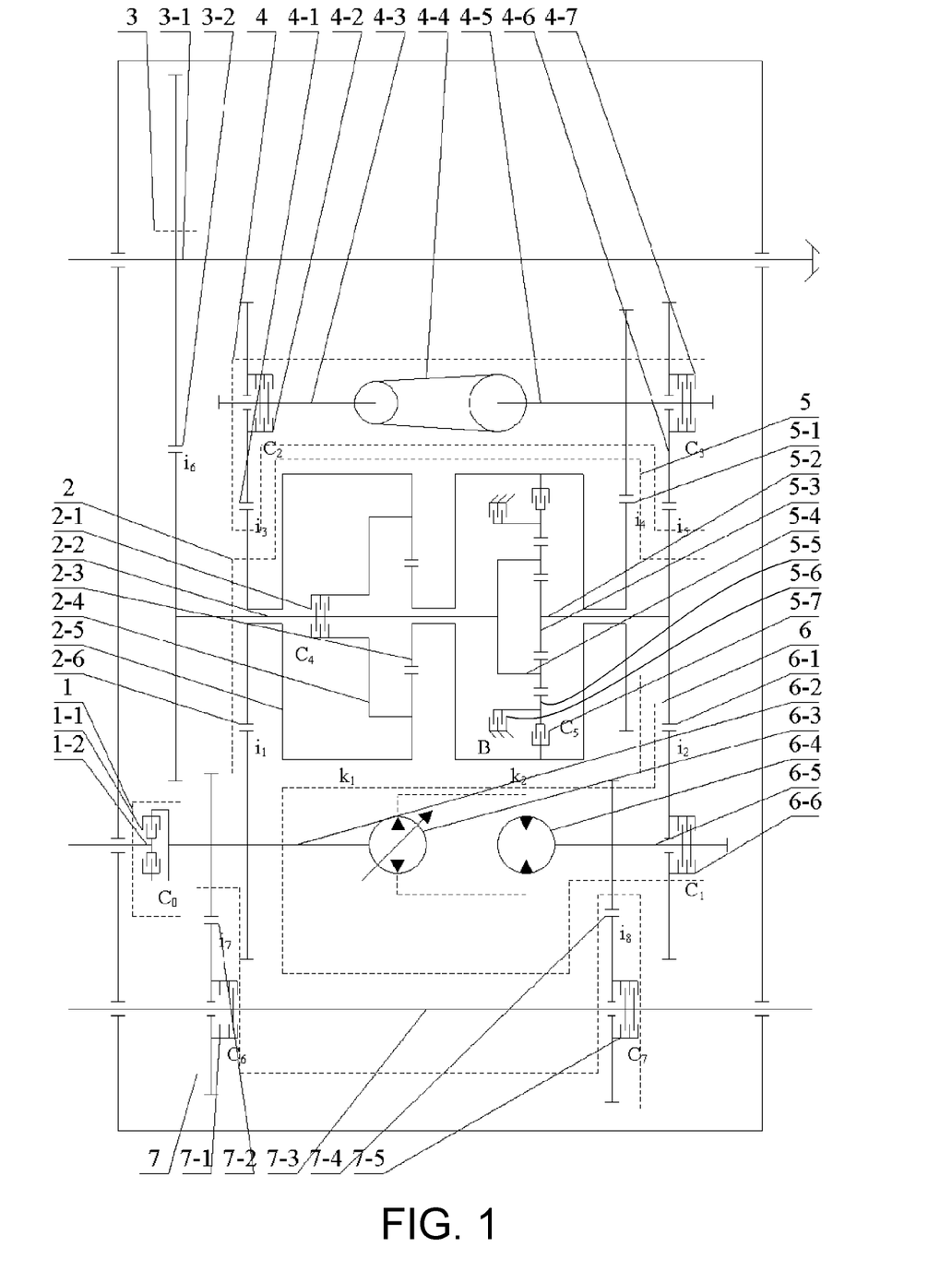
FIG. 1 is a schematic structural diagram of a gear-hydraulic-metal belt integrated multi-mode hydro-mechanical hybrid transmission device according to the present invention.

As shown in FIG. 1, a gear-hydraulic-metal belt integrated multi-mode hydro-mechanical hybrid transmission device of the present invention includes an input assembly 1, a front planetary gear mechanism 2, an output assembly 3, a metal belt transmission mechanism 4, a rear planetary gear mechanism 5, a hydraulic transmission mechanism 6, a power output mechanism 7, a clutch assembly, and a brake assembly.

The input assembly 1 includes a main clutch $C_0$ 1-1 and an input shaft 1-2. When the main clutch $C_0$ 1-1 is engaged, the power of an internal combustion engine is transmitted through the input shaft 1-2 to a hydraulic transmission input shaft 6-2.

The front planetary gear mechanism 2 includes a fourth clutch $C_4$ 2-1, a central shaft 2-2, a front planetary gear sun gear 2-3, a front planetary gear planet carrier 2-4, a front planetary gear ring gear 2-5, and a front planetary gear input gear pair 2-6. The front planetary gear sun gear 2-3, the front planetary gear planet carrier 2-4, and the front planetary gear ring gear 2-5 form a planetary gear train. The front planetary gear ring gear 2-5 is connected to the hydraulic transmission input shaft 6-2 through the front planetary gear input gear pair 2-6 in a transmission manner. The fourth clutch $C_4$ 2-1 is used for selectively connecting the front planetary gear planet carrier 2-4 to a rear planetary gear planet carrier 5-4 to achieve synchronous rotation. The front planetary gear sun gear 2-3 is fixedly connected to a rear planetary gear ring gear 5-5. The central shaft 2-2 serves as an output shaft of the rear planetary gear planet carrier 5-4.

The rear planetary gear mechanism 5 includes a rear planetary gear input gear pair 5-1, a rear planetary gear sun gear shaft 5-2, a rear planetary gear sun gear 5-3, the rear planetary gear planet carrier 5-4, the rear planetary gear ring gear 5-5, a brake assembly 5-6, and a fifth clutch $C_5$ 5-7. The rear planetary gear sun gear 5-3, the rear planetary gear planet carrier 5-4, and the rear planetary gear ring gear 5-5 form a planetary gear train. The rear planetary gear ring gear 5-5 is connected to a metal belt output shaft 4-5 through the rear planetary gear input gear pair 5-1. The fifth clutch $C_5$ 5-7 is used for selectively connecting the rear planetary gear ring gear 5-5 to the front planetary gear sun gear 2-3 to achieve synchronous rotation. The brake assembly 5-6 is used for selectively connecting the rear planetary gear ring gear 5-5 to a fixed member. The rear planetary gear planet carrier 5-4 is connected to an output shaft 3-1 through an output gear pair 3-2. The rear planetary gear sun gear 5-3 is fixedly connected to the rear planetary gear sun gear shaft 5-2.

The metal belt transmission mechanism 4 includes a metal belt input gear pair 4-1, a second clutch $C_2$ 4-2, a metal belt input shaft 4-3, a metal belt 4-4, the metal belt output shaft 4-5, a metal belt output gear pair 4-6, and a third clutch $C_3$ 4-7. The metal belt output shaft 4-5 is connected to the rear planetary gear ring gear 5-5 through the rear planetary gear input gear pair 5-1. The second clutch $C_2$ 4-2 is used for selectively connecting the metal belt input shaft 4-3 to the front planetary gear ring gear 2-5 through the metal belt input gear pair 4-1 to achieve synchronous rotation. The third clutch $C_3$ 4-7 is used for selectively connecting the metal belt output shaft 4-5 to the rear planetary gear sun gear shaft 5-2 through the metal belt output gear pair 4-6 to achieve synchronous rotation. The metal belt input shaft 4-3 is connected to the metal belt output shaft 4-5 through the metal belt 4-4 in a transmission manner.

The hydraulic transmission mechanism 6 includes a hydraulic transmission output gear pair 6-1, the hydraulic transmission input shaft 6-2, a variable pump 6-3, a quantitative motor 6-4, a hydraulic transmission output shaft 6-5, and a first clutch $C_1$ 6-6. The hydraulic transmission input shaft 6-2 is connected to the variable pump 6-3. The quantitative motor 6-4 is connected to the hydraulic transmission output shaft 6-5. The variable pump 6-3 is used for driving the quantitative motor 6-4. The first clutch $C_1$ 6-6 is used for selectively connecting the hydraulic transmission output shaft 6-5 to the rear planetary gear sun gear shaft 5-2 through the hydraulic transmission output gear pair 6-1 to achieve synchronous rotation.

The power output mechanism 7 includes a sixth clutch $C_6$ 7-1, a front power output gear pair 7-2, a power output shaft 7-3, a rear power output gear pair 7-4, and a seventh clutch $C_7$ 7-5. The sixth clutch $C_6$ 7-1 is used for selectively connecting the hydraulic transmission input shaft 6-2 to the power output shaft 7-3 through the front power output gear pair 7-2 to achieve synchronous rotation. The seventh clutch $C_7$ 7-5 is used for selectively connecting the hydraulic transmission output shaft 6-5 to the power output shaft 7-3 through the rear power output gear pair 7-4 to achieve synchronous rotation. The sixth clutch $C_6$ 7-1 and the seventh clutch $C_7$ 7-5 are not engaged at the same time.

Figure 2:
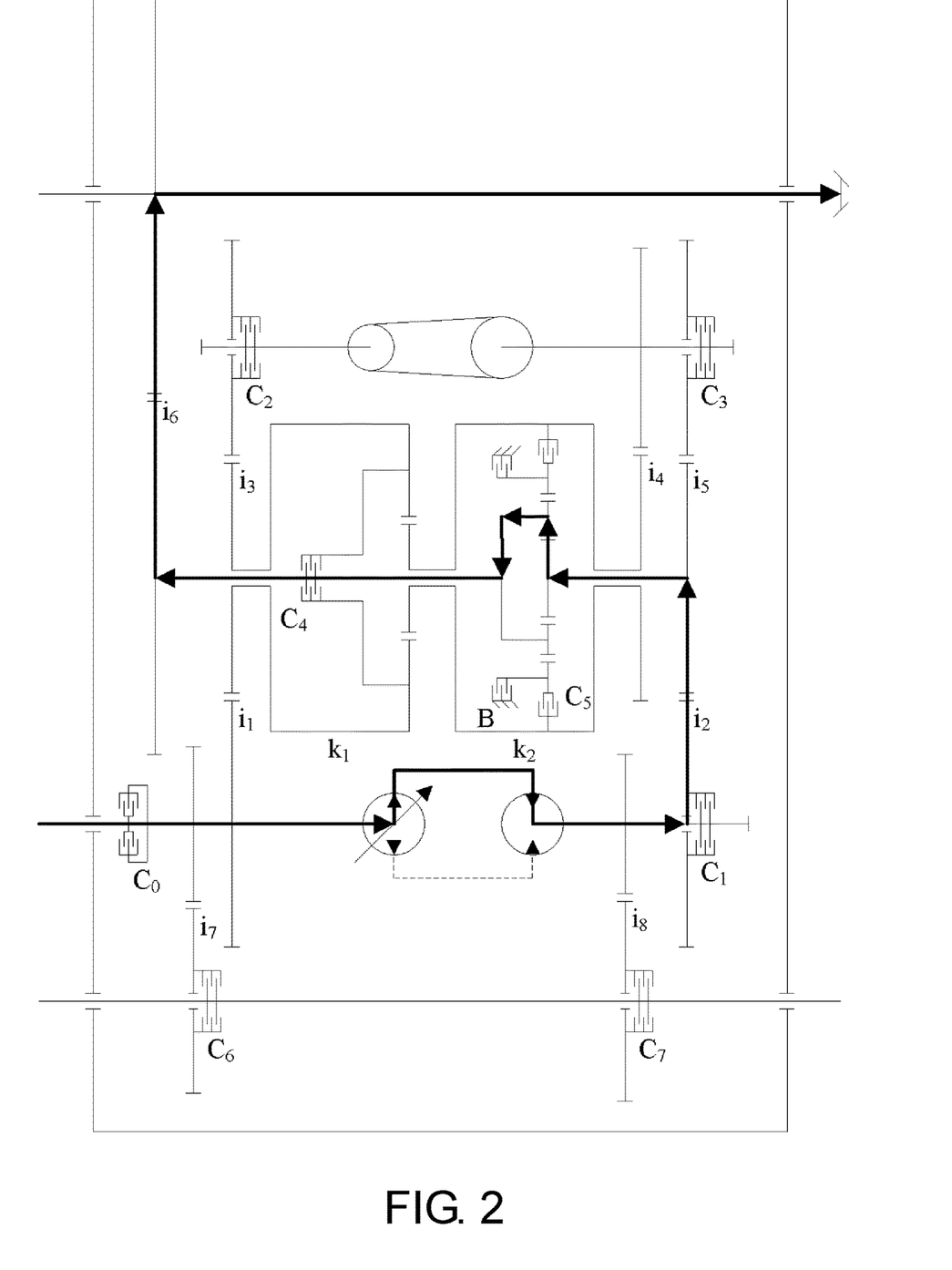
FIG. 2 is a schematic diagram showing a power flow in a mode of hydraulic transmission H according to the present invention.

Any one transmission mode of hydraulic transmission H, gear transmission G, metal belt transmission V, hydraulic-gear hybrid transmission HG, gear-metal belt hybrid transmission GV, and hydraulic-metal belt hybrid transmission HV is provided between the input assembly 1 and the output assembly 3. The engaged components in each transmission mode are shown in Table 1. The details are as follows:

As shown in FIG. 2, in the transmission mode of hydraulic transmission H, the main clutch $C_0$ 1-1, the first clutch $C_1$ 6-6, the fifth clutch $C_5$ 5-7, and the brake assembly 5-6 are engaged, so that the engine power transmitted by the input shaft 1-2 passes through the hydraulic transmission input shaft 6-2 to drive the variable pump 6-3 to work, thereby forcing the quantitative motor 6-4 to rotate. Since the rear planetary gear ring gear 5-5 is braked by the brake assembly 5-6, the power output by the quantitative motor 6-4 is transmitted through the rear planetary gear sun gear 5-3 and the rear planetary gear planet carrier 5-4 to the central shaft 2-2, then passes through the output gear pair 3-2, and is output from the output shaft 3-1.

Figure 3:
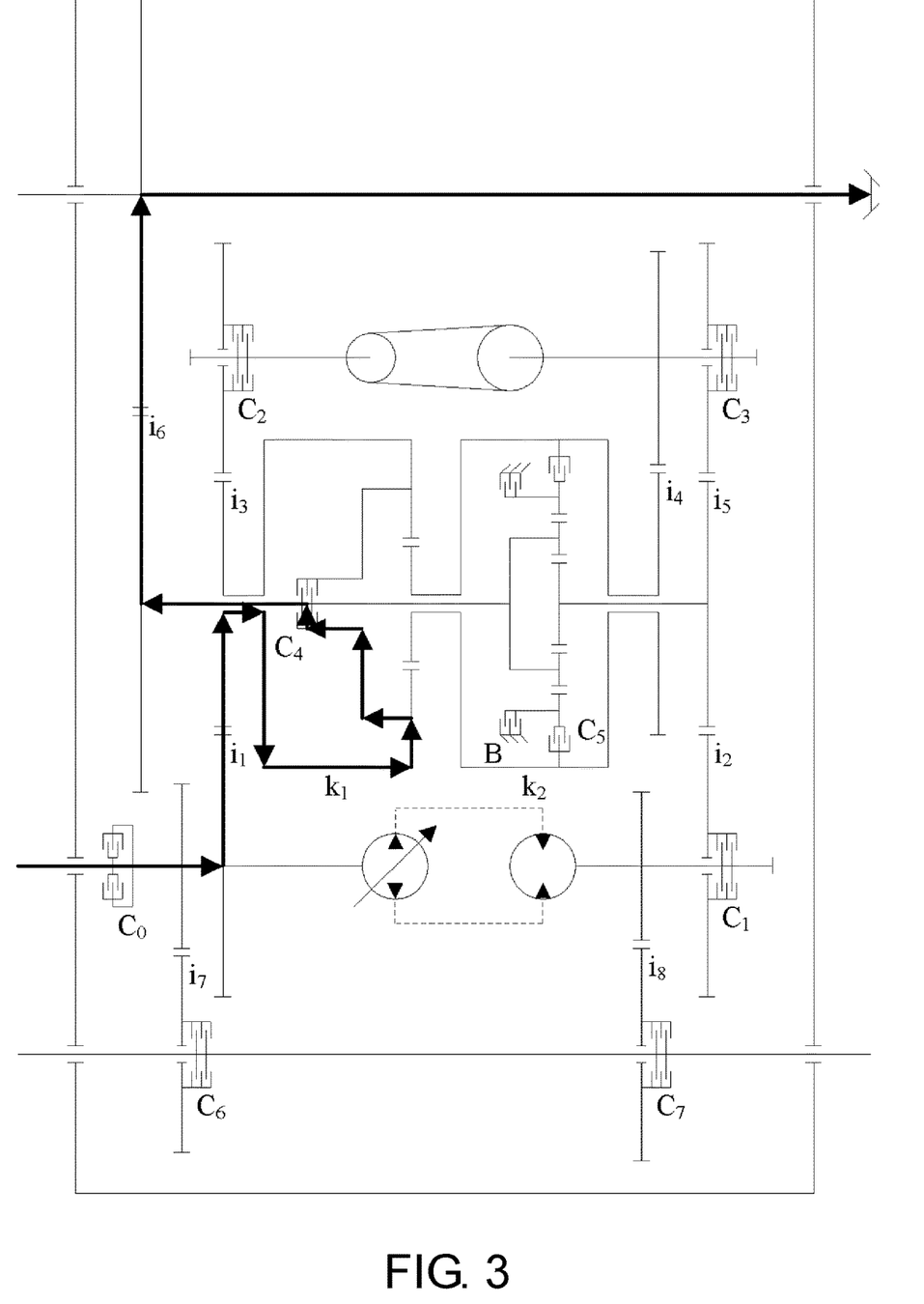
FIG. 3 is a schematic diagram showing a power flow in a mode of gear transmission G according to the present invention.

As shown in FIG. 3, in the transmission mode of gear transmission G, the main clutch $C_0$ 1-1, the fourth clutch $C_4$ 2-1, the fifth clutch $C_5$ 5-7, and the brake assembly 5-6 are engaged, so that the engine power transmitted by the input shaft 1-2 passes through the front planetary gear input gear pair 2-6 to drive the front planetary gear ring gear 2-5. Since the rear planetary gear ring gear 5-5 is braked by the brake assembly 5-6, that is, the front planetary gear sun gear 2-3 is braked, the power output by the front planetary gear planet carrier 2-4 passes through the output gear pair 3-2 and is output from the output shaft 3-1.

Figure 4:
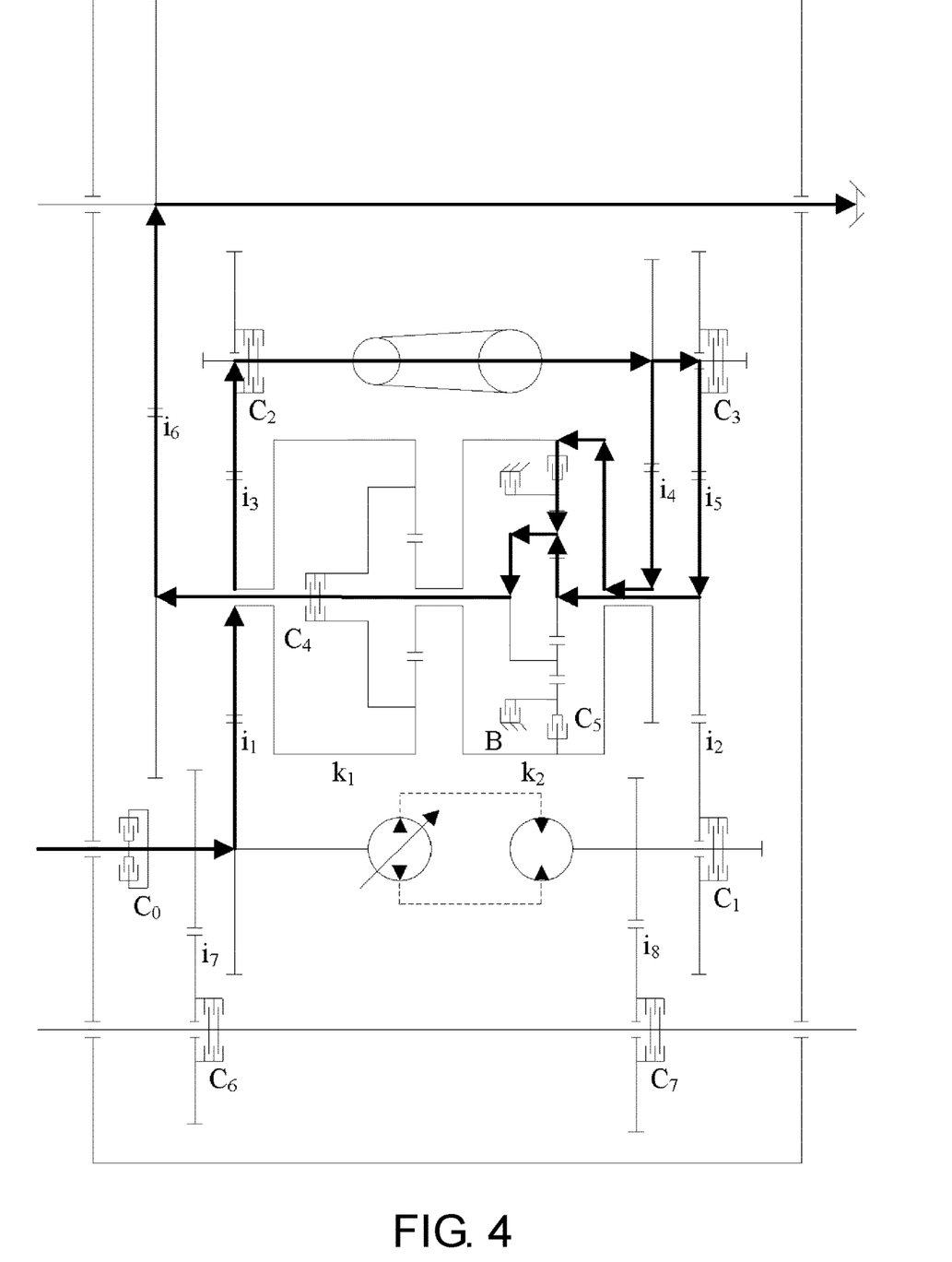
FIG. 4 is a schematic diagram showing a power flow in a mode of metal belt transmission V according to the present invention.

As shown in FIG. 4, in the transmission mode of metal belt transmission V, the main clutch $C_0$ 1-1, the second clutch $C_2$ 4-2, and the third clutch $C_3$ 4-7 are engaged, so that the engine power transmitted by the input shaft 1-2 passes through the front planetary gear input gear pair 2-6 and the metal belt input gear pair 4-1 to the metal belt input shaft 4-3 to drive the metal belt 4-4. The transmission ratio of the metal belt 4-4 varies with changes in radii of its driving and driven discs. The power transmitted by the metal belt 4-4 passes through the metal belt output shaft 4-5 and is split into two parts: one part of the power is transmitted through the rear planetary gear input gear pair 5-1 to the rear planetary gear ring gear 5-5, while the other part of the power is transmitted through the metal belt output gear pair 4-6 and the rear planetary gear sun gear shaft 5-2 to the rear planetary gear sun gear 5-3. The power transmitted to the rear planetary gear ring gear 5-5 and the power transmitted to the rear planetary gear sun gear 5-3 are converged at the rear planetary gear planet carrier 5-4. Then, the power passes through the central shaft 2-3 and the output gear pair 3-2 and is output from the output shaft 3-1.

Figure 5:
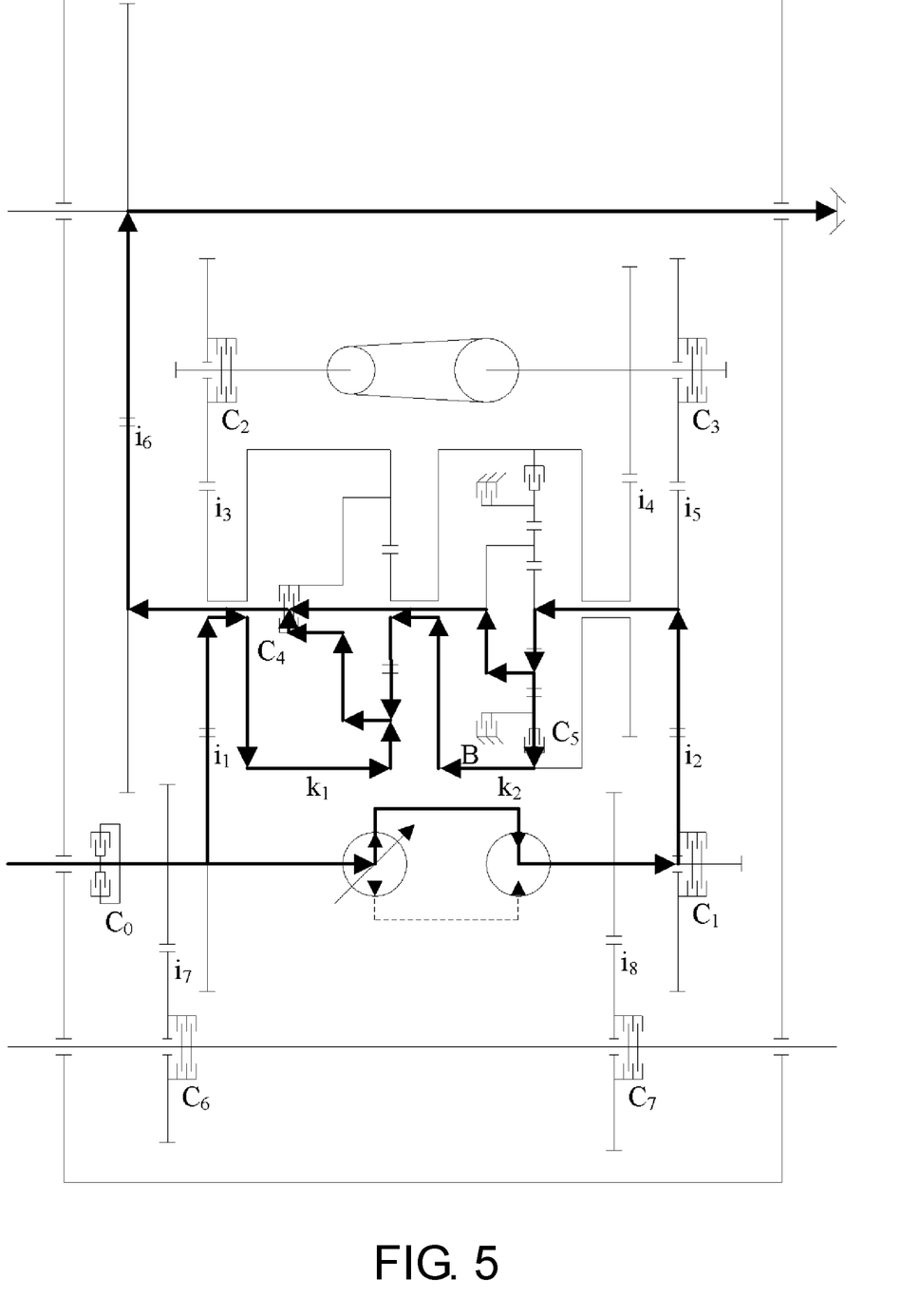
FIG. 5 is a schematic diagram showing a power flow in hydraulic-gear hybrid transmission HG according to the present invention.

As shown in FIG. 5, in the transmission mode of hydraulic-gear hybrid transmission HG, the main clutch $C_0$ 1-1, the first clutch $C_1$ 6-6, the fourth clutch $C_4$ 2-1, and the fifth clutch $C_5$ 5-7 are engaged, so that the engine power transmitted by the input shaft 1-2 passes through the front planetary gear input gear pair 2-6 and is split into two parts: one part of the power is directly transmitted to the front planetary gear ring gear 2-5, while the other part of the power is transmitted through the hydraulic transmission input shaft 6-2 to drive the variable pump 6-3, thereby forcing the quantitative motor 6-4 to rotate. The power output by the quantitative motor 6-4 passes through the rear planetary gear sun gear 5-3 and is split into two parts: one part of the power is transmitted through the rear planetary gear ring gear 5-5 and the front planetary gear sun gear 2-3 and is converged, at the front planetary gear planet carrier 2-4, with the power directly transmitted to the front planetary gear ring gear 2-5, while the other part of the power is transmitted through the rear planetary gear planet carrier 5-4 and is converged with the power obtained by convergence at the front planetary gear planet carrier 2-4. Then, the power passes through the central shaft 2-3 and the output gear pair 3-2 and is output from the output shaft 3-1.

Figure 6:
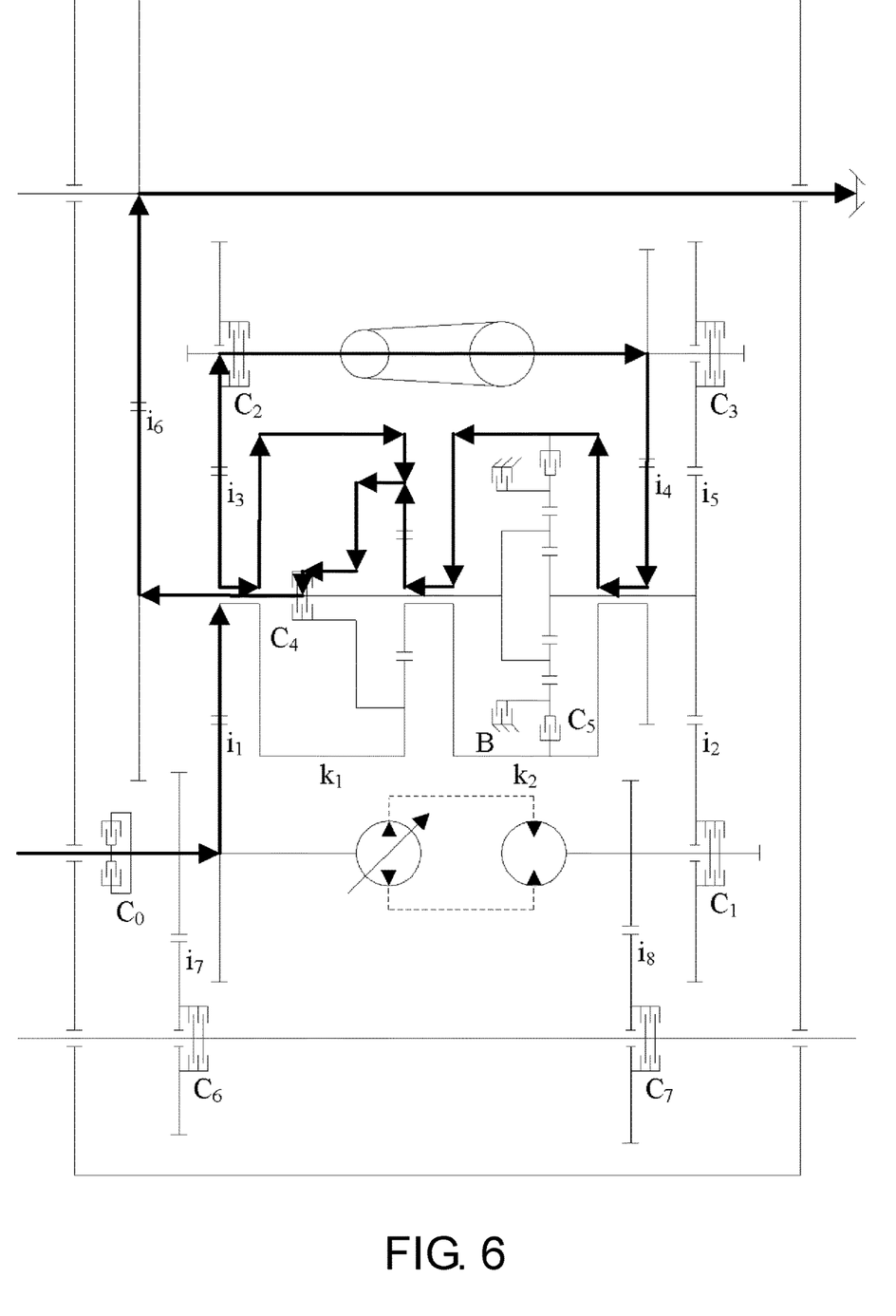
FIG. 6 is a schematic diagram showing a power flow in gear-metal belt hybrid transmission GV according to the present invention.

As shown in FIG. 6, in the transmission mode of gear-metal belt hybrid transmission GV, the main clutch $C_0$ 1-1, the second clutch $C_2$ 4-2, and the fourth clutch $C_4$ 2-1 are engaged, so that the engine power transmitted by the input shaft 1-2 passes through the front planetary gear input gear pair 2-6 and is split into two parts: one part of the power is transmitted through the metal belt input gear pair 4-1 and the metal belt input shaft 4-3 to drive the metal belt 4-4, wherein the transmission ratio of the metal belt 4-4 varies with changes in radii of its driving and driven discs, and the power is transmitted through the metal belt output shaft 4-5, the rear planetary gear input gear pair 5-1, and the rear planetary gear ring gear 5-5 to the front planetary gear sun gear 2-3, while the other part of the power is directly transmitted to the front planetary gear ring gear 2-5. The power transmitted to the front planetary gear sun gear 2-3 and the power transmitted to the front planetary gear ring gear 2-5 are converged at the front planetary gear planet carrier 2-4. Then, the power passes through the central shaft 2-3 and the output gear pair 3-2 and is output from the output shaft 3-1.

Figure 7:
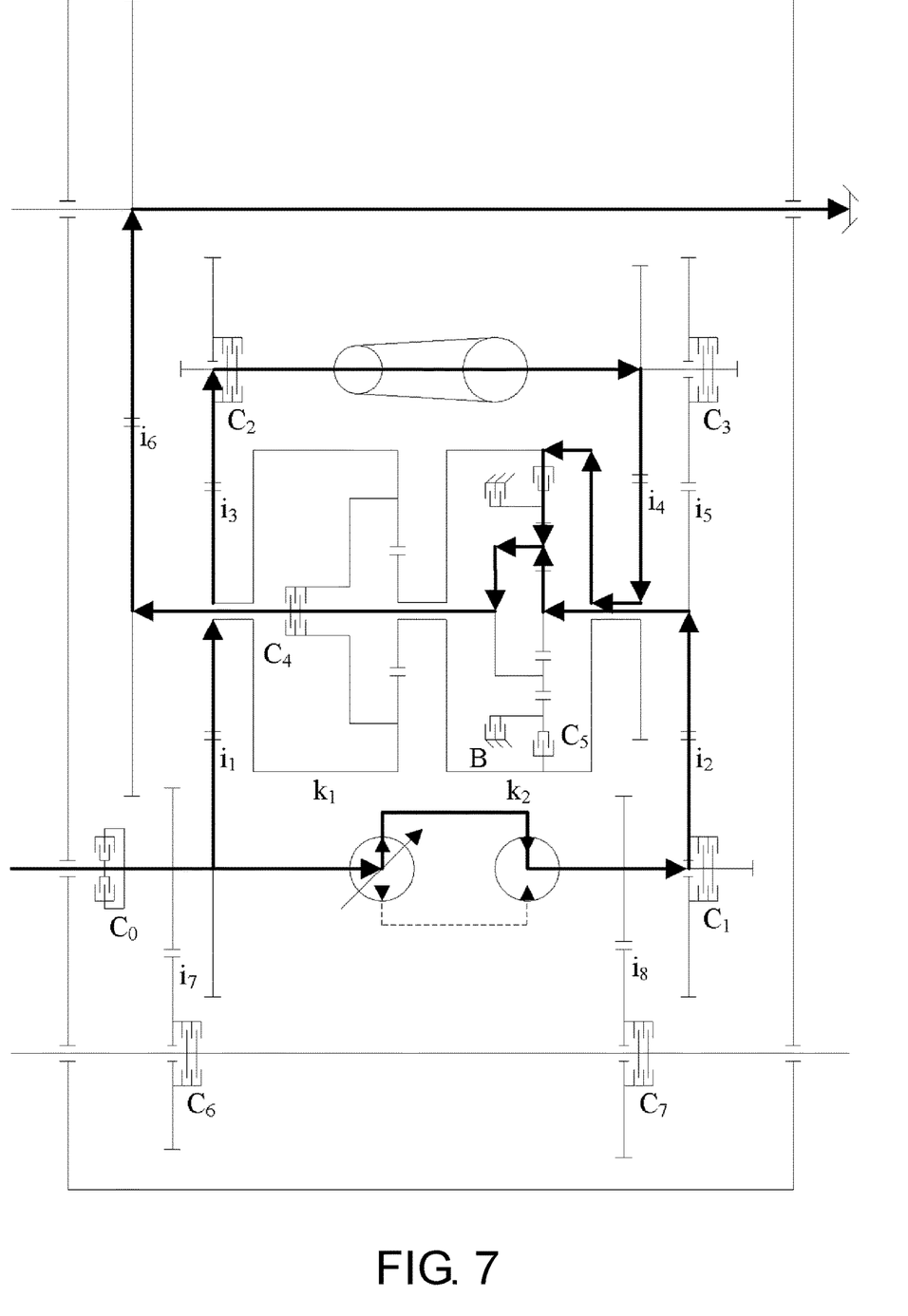
FIG. 7 is a schematic diagram showing a power flow in hydraulic-metal belt hybrid transmission HV according to the present invention.

As shown in FIG. 7, in the transmission mode of hydraulic-metal belt hybrid transmission HV, the main clutch $C_0$ 1-1, the first clutch $C_1$ 6-6, the second clutch $C_2$ 4-2, and the fifth clutch $C_5$ 5-7 are engaged, so that the engine power transmitted by the input shaft 1-2 passes through the front planetary gear input gear pair 2-6 and is split into two parts. One part of the power is transmitted through the metal belt input gear pair 4-1 and the metal belt input shaft 4-3 to drive the metal belt 4-4, wherein the transmission ratio of the metal belt 4-4 varies with changes in radii of its driving and driven discs, and the power is transmitted through the metal belt output shaft 4-5 and the rear planetary gear input gear pair 5-1 to the rear planetary gear ring gear 5-5, while the other part of the power is transmitted through the hydraulic transmission input shaft 6-2 to drive the variable pump 6-3, thereby forcing the quantitative motor 6-4 to rotate. The power output by the quantitative motor 6-4 is transmitted through the hydraulic transmission output gear pair 6-1 and the rear planetary gear sun gear shaft 5-2 to the rear planetary gear sun gear 5-3. The power transmitted to the rear planetary gear ring gear 5-5 and the power transmitted to the rear planetary gear sun gear 5-3 are converged at the rear planetary gear planet carrier 5-4. Then, the power passes through the central shaft 2-3 and the output gear pair 3-2 and is output from the output shaft 3-1.

TABLE 1

Engagement state of mode-switching components

| Type | Mode | $C_0$ | $C_1$ | $C_2$ | $C_3$ | $C_4$ | $C_5$ | B | Relationships of output-input rotation speeds |
|---|---|---|---|---|---|---|---|---|---|
| Single-flo transmission | Hydraulic transmission H | ▲ | ▲ | | | | ▲ | ▲ | $n_o(H) = \dfrac{e}{k_2+1} \dfrac{1}{i_2 i_6} n_e$ |
| | Gear transmission G | ▲ | | | | ▲ | ▲ | ▲ | $n_o(G) = \dfrac{k_1}{k_1+1} \dfrac{1}{i_1 i_6} n_e$ |
| | Metal belt transmission V | ▲ | | ▲ | ▲ | | | | $n_o(V) = \dfrac{\dfrac{1}{i_5} + \dfrac{k_2}{i_4}}{k_2+1} \dfrac{1}{i_1 i_3 i_6 i_v} n_e$ |
| Hybrid transmission | Hydraulic-gear transmission HG | ▲ | ▲ | | | ▲ | ▲ | | $n_o(HG) = \dfrac{\dfrac{k_1 k_2}{i_1} - \dfrac{e}{i_2}}{(k_1 k_2 - 1) i_6} n_e$ |
| | Gear-metal belt transmission GV | ▲ | | ▲ | | ▲ | | | $n_o(GV) = \dfrac{k_1 + \dfrac{1}{i_3 i_4 i_v}}{(k_1+1) i_1 i_6} n_e$ |
| | Hydraulic-metal belt transmission HV | ▲ | ▲ | ▲ | | | ▲ | | $n_o(HV) = \dfrac{\dfrac{k_2}{i_1 i_3 i_4 i_v} + \dfrac{e}{i_2}}{(k_2+1) i_6} n_e$ |

Wherein: ▲ indicates that the mode-switching execution mechanism is engaged. $n_o(H)$ is an output rotation speed in the mode of hydraulic transmission H, $n_o(G)$ is an output rotation speed in the mode of gear transmission G, $n_o(V)$ is an output rotation speed in the mode of metal belt transmission V, $n_o(GV)$ is an output rotation speed in the mode of gear-metal belt transmission GV, $n_o(HG)$ is an output rotation speed in the mode of hydraulic-gear transmission HG, $n_o(HV)$ is an output rotation speed in the mode of hydraulic-metal belt transmission HV, and $n_e$ is an engine speed. $k_1$ is a planetary gear characteristic parameter of the front planetary gear mechanism, $k_2$ is a planetary gear characteristic parameter of the rear planetary gear mechanism, e is a displacement ratio of the hydraulic transmission mechanism, $i_v$ is a transmission ratio of the metal belt transmission mechanism, $i_1$ is a transmission ratio of the front planetary gear input gear pair, $i_2$ is a transmission ratio of the hydraulic transmission output gear pair, $i_3$ is a transmission ratio of the metal belt input gear pair, $i_4$ is a transmission ratio of the rear planetary gear input gear pair, $i_5$ is a transmission ratio of the metal belt output gear pair, and $i_6$ is a transmission ratio of the output gear pair.

Stepless speed regulation through switching among the transmission modes "hydraulic transmission H→gear transmission G→hydraulic-gear hybrid transmission HG" is provided by adjusting the displacement ratio of the hydraulic transmission mechanism 6 and selectively controlling engagement of the clutch assembly and the brake assembly. The mode of hydraulic transmission H is adopted for startup, and the output rotation speed increases linearly with the increase of the displacement ratio e of the hydraulic transmission mechanism. When e=−1, the mode of hydraulic transmission H reaches a negative maximum value. When e=1, the mode of hydraulic transmission H reaches a positive maximum value, and can be switched to the mode of gear transmission G with a fixed transmission ratio. When e∈[$n_o$(G)=$n_o$(HG)], the mode of gear transmission G can be switched to the mode of hydraulic-gear hybrid transmission HG, wherein the output rotation speed increases linearly with the decrease of e, and when e=−1, the mode of hydraulic-gear hybrid transmission HG reaches a positive maximum value. The transmission ratio $i_v$ of the metal belt transmission mechanism has no influence on changes in the transmission ratio of the transmission device during the mode switching process, and the transmission device achieves stepless speed variation within a set range only by changing e.

Stepless speed regulation through switching among the transmission modes "gear transmission G→metal belt transmission V→gear-metal belt hybrid transmission GV" is provided by adjusting the transmission ratio of the metal belt transmission mechanism 4 and selectively controlling engagement of the clutch assembly and the brake assembly. The mode of gear transmission G has a fixed transmission ratio, and can be switched to the mode of metal belt transmission V, wherein when $i_v$ changes from 2 to 0.5, $n_o$(V) increases non-linearly. When the transmission ratio of the metal belt transmission mechanism satisfies $i_v$∈[$n_o$(V)=$n_o$(GV)], the mode of metal belt transmission V can be switched to the mode of gear-metal belt hybrid transmission GV, wherein when $i_v$ changes from 2 to 0.5, $n_o$(GV) increases non-linearly. The displacement ratio e of the hydraulic transmission mechanism has no influence on changes in the transmission ratio of the transmission device during the mode switching process, and the transmission device achieves stepless speed variation within a set range only by changing $i_v$.

Stepless speed regulation through switching among the transmission modes "hydraulic transmission H→metal belt transmission V→hydraulic-metal belt hybrid transmission HV" is provided by adjusting the displacement ratio of the hydraulic transmission mechanism 6, adjusting the transmission ratio of the metal belt transmission mechanism 4, and selectively controlling engagement of the clutch assembly and the brake assembly. The mode of hydraulic transmission H is adopted for startup, and the output rotation speed increases linearly with the increase of the displacement ratio e of the hydraulic transmission mechanism. When e=1, the mode of hydraulic transmission H reaches a positive maximum value. When e·$i_v$∈[$n_o$(H)=$n_o$(V)], e∈[0,1], and $i_v$∈[0.5,2] are all satisfied, the mode of hydraulic transmission H is switched to the mode of metal belt transmission V, wherein when $i_v$ changes from 2 to 0.5, $n_o$(V) increases non-linearly. When e·$i_v$∈[$n_o$(V)=$n_o$(HV)], e∈[0,1], and $i_v$∈[0.5, 2] are all satisfied, the mode of metal belt transmission V is switched to the mode of hydraulic-metal belt hybrid transmission HV. The output value of the mode of hydraulic-metal belt hybrid transmission HV differs with the switching position, but the output rotation speed decreases linearly with the decrease of the displacement ratio e of the hydraulic transmission mechanism.

For example:

The main parameters are: $i_1$=1, $i_2$=0.36, $i_3$=0.73, $i_4$=$i_5$=$i_6$=1, $k_1$=2.27, and $k_2$=3.

In a first mode switching process: hydraulic transmission H→gear transmission G→hydraulic-gear transmission HG.

Relationships of output-input rotation speeds in hydraulic transmission H satisfy:

$$n_o(H) = \frac{e}{1.44}n_e = 0.69en_e.$$

Relationships of output-input rotation speeds in gear transmission G satisfy:

$$n_o(G) = \frac{2.27}{3.27}n_e = 0.694n_e.$$

Relationships of output-input rotation speeds in hydraulic-gear hybrid transmission HG satisfy:

$$n_o(HG) = \frac{6.81 - \frac{e}{0.36}}{5.81}n_e = (1.172 - 0.478)n_e.$$

Figure 8:
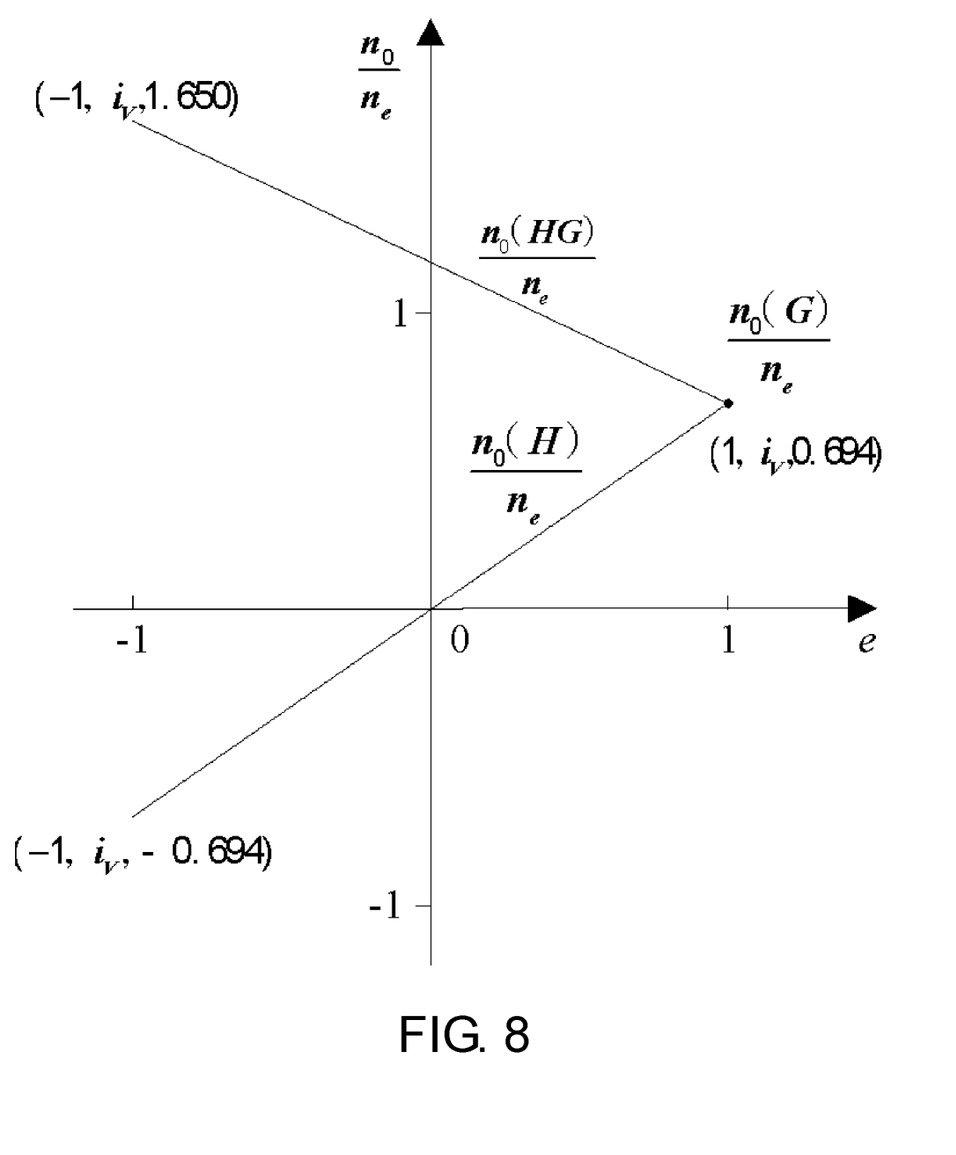
FIG. 8 is a diagram showing relationships between output rotation speeds and input rotation speeds in a mode switching process (H→G→HG) according to the present invention.

As shown in FIG. 8, the mode of hydraulic transmission H is adopted for startup, and the output rotation speed increases linearly with the increase of the displacement ratio e of the hydraulic transmission mechanism. When e=−1, the mode of hydraulic transmission H reaches a negative maximum value −0.694$n_e$. When e=1, the mode of hydraulic transmission H reaches a positive maximum value 0.694$n_e$, and can be switched to the mode of gear transmission G with a fixed transmission ratio; or can be switched to the mode of hydraulic-gear hybrid transmission HG, wherein the output rotation speed increases linearly with the decrease of e, and when e=−1, the mode of hydraulic-gear hybrid transmission HG reaches a positive maximum value 1.650$n_e$. The transmission ratio $i_v$ of the metal belt transmission mechanism has no influence on changes in the transmission ratio of the transmission device during the mode switching process, and the transmission device achieves stepless speed variation within a range of [0, 1.650]$n_e$ only by changing e.

In a second mode switching process: gear transmission G→metal belt transmission V→gear-metal belt transmission GV.

Relationships of output-input rotation speeds in gear transmission G satisfy:

$$n_o(G) = \frac{2.27}{3.27}n_e = 0.694n_e.$$

Relationships of output-input rotation speeds in metal belt transmission V satisfy:

$$n_o(V) = \frac{1}{0.73i_v}n_e = \frac{1.370}{i_v}n_e.$$

Relationships of output-input rotation speeds in gear-metal belt hybrid transmission GV satisfy:

$$n_o(GV) = \frac{2.27 + \frac{1}{0.73i_V}}{3.27}n_e = \left(0.694 + \frac{0.419}{i_V}\right)n_e.$$

Figure 9:
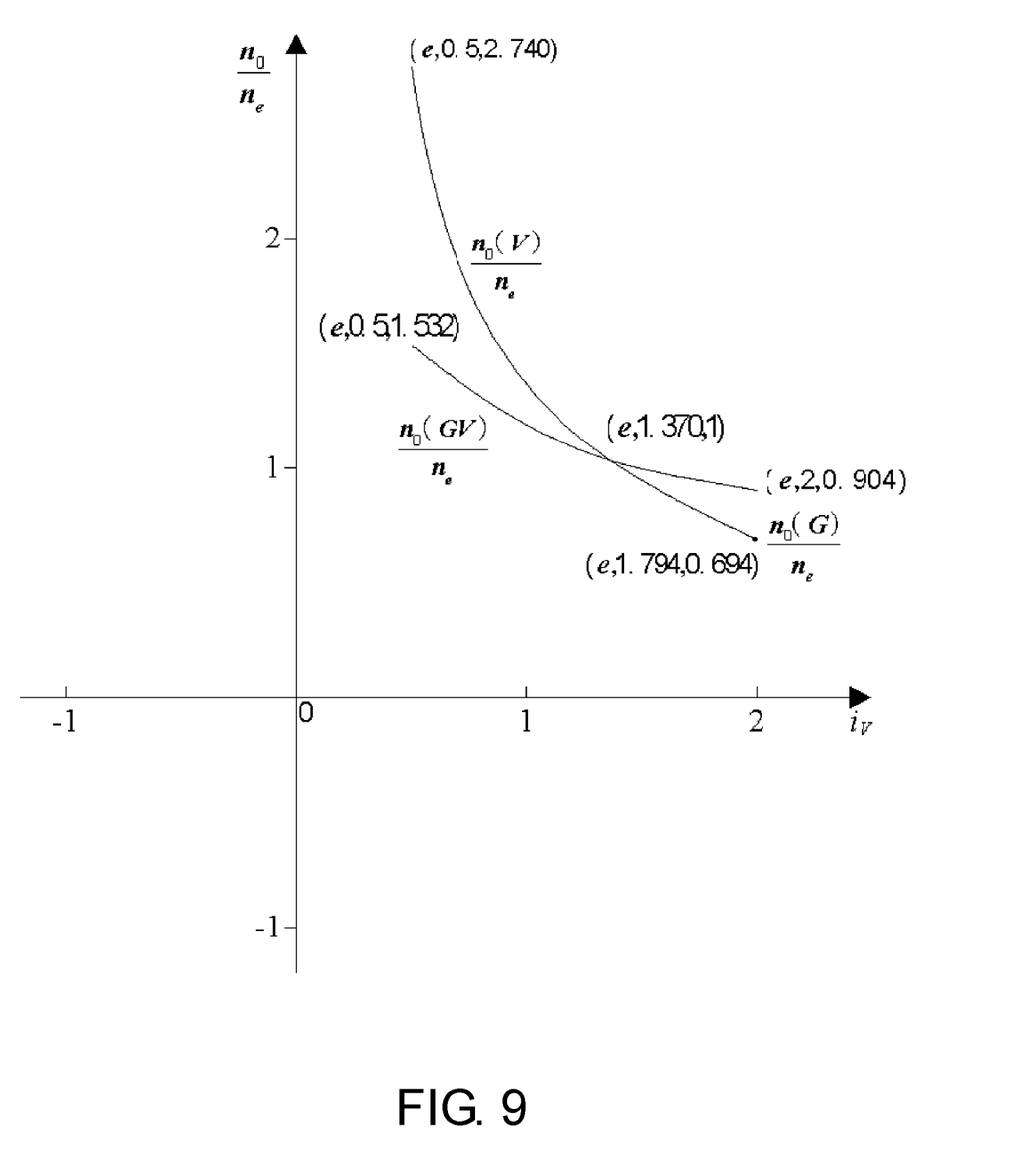
FIG. 9 is a diagram showing relationships between output rotation speeds and input rotation speeds in a mode switching process (G→V→GV) according to the present invention.

As shown in FIG. 9, the mode of gear transmission G has a fixed transmission ratio, and can be switched to the mode of metal belt transmission V, wherein the transmission ratio of the metal belt transmission mechanism is $i_v$=1.794, and when $i_v$ changes from 2 to 0.5, $n_o(V)$ increases non-linearly from $0.694n_e$ to $2.740n_e$. When the transmission ratio of the metal belt transmission mechanism is $i_v$=1.370, the mode of metal belt transmission V can be switched to the mode of gear-metal belt hybrid transmission GV, wherein when $i_v$ changes from 2 to 0.5, $n_o(GV)$ increases non-linearly from $0.904n_e$ to $1.532n_e$. The displacement ratio e of the hydraulic transmission mechanism has no influence on changes in the transmission ratio of the transmission device during the mode switching process, and the transmission device achieves stepless speed variation within a range of $[0.694, 2.740]n_e$ only by changing $i_v$.

In a third mode switching process: hydraulic transmission H→metal belt transmission V→hydraulic-metal belt transmission HV.

Relationships of output-input rotation speeds in hydraulic transmission H satisfy:

$$n_o(H) = \frac{e}{1.44}n_e = 0.694en_e.$$

Relationships of output-input rotation speeds in metal belt transmission V satisfy:

$$n_o(V) = \frac{1}{0.73i_V}n_e = \frac{1.370}{i_V}n_e.$$

Relationships of output-input rotation speeds in hydraulic-metal belt hybrid transmission HV satisfy:

$$n_o(HV) = \frac{\frac{3}{0.73i_V} + \frac{e}{0.36}}{4}n_e = \left(\frac{1.027}{i_V} + 0.69e\right)n_e.$$

Figure 10:
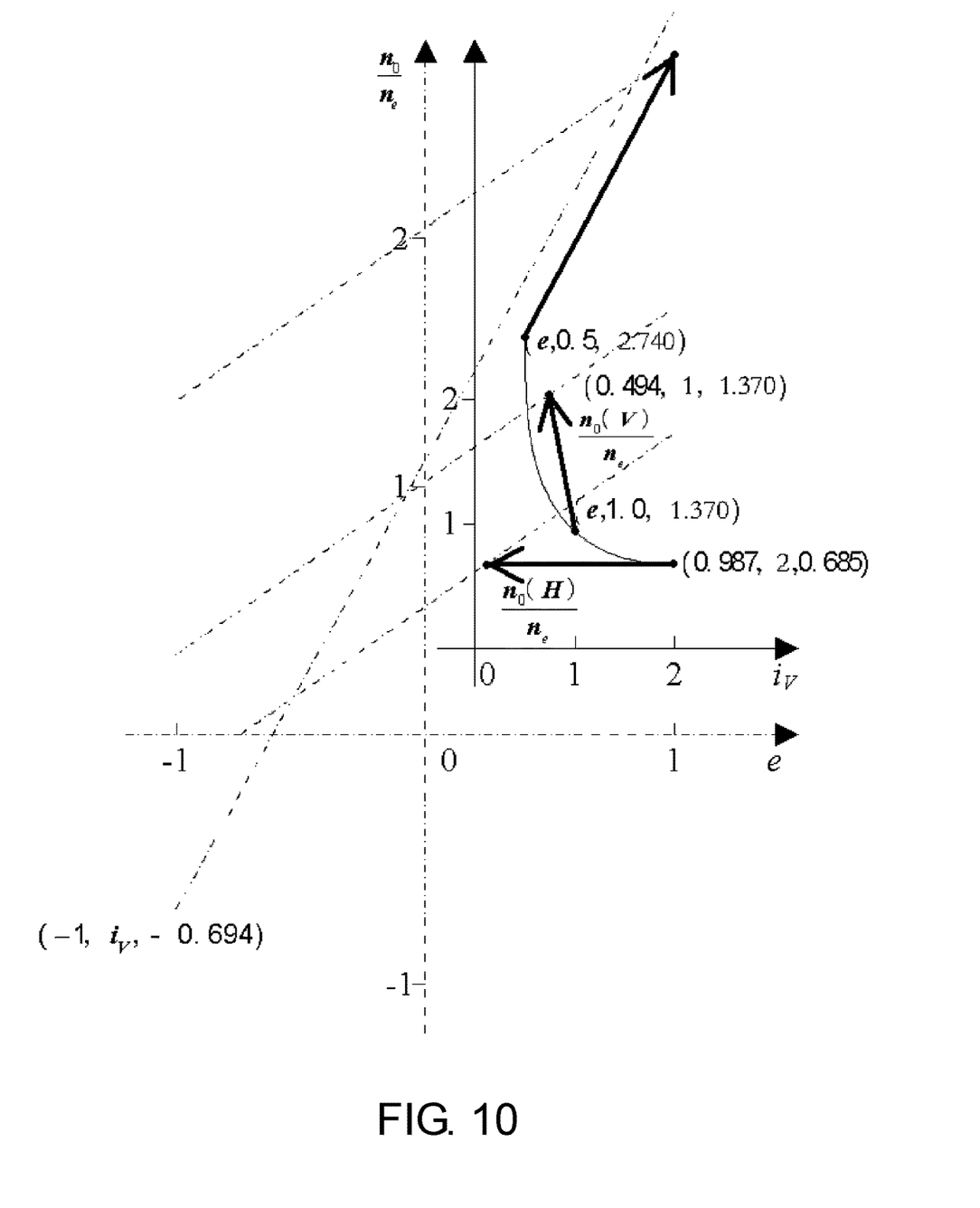
FIG. 10 is a diagram showing relationships between output rotation speeds and input rotation speeds in a mode switching process (H→V→HV) according to the present invention.

As shown in FIG. 10, the mode of hydraulic transmission H is adopted for startup, and the output rotation speed increases linearly with the increase of the displacement ratio e of the hydraulic transmission mechanism. When e=1, the mode of hydraulic transmission H reaches a positive maximum value $0.694n_e$. When $e \cdot i_v$=1.974, $e \in [0,1]$, and $i_v \in [0.5, 2]$ are all satisfied, the mode of hydraulic transmission H is switched to the mode of metal belt transmission V, wherein when $i_v$ changes from 2 to 0.5, $n_o(V)$ increases non-linearly from $0.685n_e$ to $2.740n_e$.

When $e \cdot i_v$=0.494, $e \in [0,1]$, and $i_v \in [0.5, 2]$ are all satisfied, the mode of metal belt transmission V is switched to the mode of hydraulic-metal belt hybrid transmission HV. The output value of the mode of hydraulic-metal belt hybrid transmission HV differs with the switching position, but the output rotation speed decreases linearly with the decrease of the displacement ratio e of the hydraulic transmission mechanism.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A gear-hydraulic-metal belt integrated multi-mode hydro-mechanical hybrid transmission device, comprising an input assembly, an output assembly, a metal belt transmission mechanism, a planetary gear assembly, a hydraulic transmission mechanism, a clutch assembly, and a brake assembly, wherein the input assembly is connected to the metal belt transmission mechanism, the planetary gear assembly and the hydraulic transmission mechanism; the metal belt transmission mechanism and the hydraulic transmission mechanism are each connected to the planetary gear assembly; the planetary gear assembly is connected to the output assembly; the clutch assembly connects the input assembly to the metal belt transmission mechanism and the planetary gear assembly, and connects each of the metal belt transmission mechanism and the hydraulic transmission mechanism to the planetary gear assembly.

2. The gear-hydraulic-metal belt integrated multi-mode hydro-mechanical hybrid transmission device according to claim 1, wherein the planetary gear assembly comprises a front planetary gear mechanism and a rear planetary gear mechanism, a ring gear of the front planetary gear mechanism is connected to an output end of the input assembly; a sun gear of the front planetary gear mechanism is connected to a ring gear of the rear planetary gear mechanism, a planet carrier of the rear planetary gear mechanism is connected to the output assembly; the ring gear of the rear planetary gear mechanism is connected to an output end of the metal belt transmission mechanism.

3. The gear-hydraulic-metal belt integrated multi-mode hydro-mechanical hybrid transmission device according to claim 2, wherein the clutch assembly comprises a first clutch and a fifth clutch; the first clutch is configured for selectively connecting an output end of the hydraulic transmission mechanism to a sun gear of the rear planetary gear mechanism to achieve synchronous rotation; the fifth clutch is used for selectively connecting the ring gear of the rear planetary gear mechanism to the sun gear of the front planetary gear mechanism to achieve synchronous rotation; the brake assembly is configured for selectively connecting the ring gear of the rear planetary gear mechanism to a fixed member; a hydraulic transmission mode is provided between the input assembly and the output assembly by adjusting a displacement ratio of the hydraulic transmission mechanism and controlling engagement of the first clutch, the fifth clutch and the brake assembly.

4. The gear-hydraulic-metal belt integrated multi-mode hydro-mechanical hybrid transmission device according to claim 3, wherein the clutch assembly further comprises a fourth clutch, the fourth clutch is configured for selectively connecting a planet carrier of the front planetary gear mechanism to the planet carrier of the rear planetary gear mechanism to achieve synchronous rotation; a gear transmission mode is provided between the input assembly and the output assembly by controlling engagement of the fourth clutch, the fifth clutch and the brake assembly.

5. The gear-hydraulic-metal belt integrated multi-mode hydro-mechanical hybrid transmission device according to claim 4, wherein the clutch assembly further comprises a second clutch and a third clutch; the second clutch is configured for selectively connecting an input end of the metal belt transmission mechanism to the ring gear of the front planetary gear mechanism to achieve synchronous rotation; the third clutch is configured for selectively connecting the output end of the metal belt transmission mechanism to the sun gear of the rear planetary gear mechanism to achieve synchronous rotation; a metal belt transmission mode is provided between the input assembly and the output assembly by adjusting the transmission ratio of the metal belt transmission mechanism and controlling engagement of the second clutch and the third clutch.

6. The gear-hydraulic-metal belt integrated multi-mode hydro-mechanical hybrid transmission device according to claim 5, wherein:

a hydraulic-gear hybrid transmission mode is provided between the input assembly and the output assembly by adjusting the displacement ratio of the hydraulic transmission mechanism and controlling engagement of the first clutch, the fourth clutch and the fifth clutch;

a gear-metal belt hybrid transmission mode is provided between the input assembly and the output assembly by adjusting the transmission ratio of the metal belt transmission mechanism and controlling engagement of the second clutch and the fourth clutch; and a hydraulic-metal belt hybrid transmission mode is provided between the input assembly and the output assembly by adjusting the displacement ratio of the hydraulic transmission mechanism, adjusting the transmission ratio of the metal belt transmission mechanism, and controlling engagement of the first clutch, the second clutch and the fifth clutch.

* * * * *